United States Patent
Ueno et al.

(10) Patent No.: US 7,337,047 B2
(45) Date of Patent: Feb. 26, 2008

(54) VEHICLE BEHAVIOR CONTROL DEVICE

(75) Inventors: Hiroshi Ueno, Susono (JP); Yasushi Kobayashi, Toyota (JP); Noritaka Yamada, Mishima (JP); Yukihisa Miwa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 663 days.

(21) Appl. No.: 10/882,223

(22) Filed: Jul. 2, 2004

(65) Prior Publication Data

US 2005/0029754 A1    Feb. 10, 2005

(30) Foreign Application Priority Data

Jul. 8, 2003    (JP)    ............... 2003-193744

(51) Int. Cl.
*B60T 7/12*    (2006.01)
*G06F 19/00*    (2006.01)

(52) U.S. Cl. .............. 701/38; 701/39; 701/70; 701/90; 303/122.09; 280/5.502

(58) Field of Classification Search .......... 701/70, 701/71, 82, 38, 39, 78, 83, 90; 303/122.09, 303/113.4, 122.08; 280/5.502, 5.507, 5.512
See application file for complete search history.

(56) References Cited

U.S. PATENT DOCUMENTS

| | | | |
|---|---|---|---|
| 5,704,695 A * | 1/1998 | Monzaki et al. | 303/146 |
| 6,042,196 A | 3/2000 | Nakamura et al. | |
| 6,139,120 A | 10/2000 | Fukada | |
| 6,278,930 B1 | 8/2001 | Yamada et al. | |
| 6,304,805 B1 * | 10/2001 | Onogi | 701/36 |
| 6,324,458 B1 * | 11/2001 | Takagi et al. | 701/70 |
| 6,549,840 B1 * | 4/2003 | Mikami et al. | 701/69 |
| 6,672,687 B2 * | 1/2004 | Nishio | 303/122.09 |
| 6,692,089 B2 * | 2/2004 | Kuwajima et al. | 303/163 |
| 2003/0055549 A1 | 3/2003 | Barta et al. | |
| 2004/4217647 | 11/2004 | Einig et al. | |

FOREIGN PATENT DOCUMENTS

| | | |
|---|---|---|
| DE | 101 33 409 A1 | 1/2003 |
| JP | A 10-329682 | 12/1998 |
| JP | 11-11272 A | 1/1999 |
| JP | A 2001-047989 | 2/2001 |
| JP | A 2002-145035 | 5/2002 |
| WO | WO 99/01311 | 1/1999 |
| WO | WO 03/006293 A1 | 1/2003 |

* cited by examiner

*Primary Examiner*—Tan Q. Nguyen
(74) *Attorney, Agent, or Firm*—Oliff & Berridge, PLC

(57) ABSTRACT

The inventive vehicle behavior control device employs a novel control strategy, suppressing deterioration of a vehicle behavior which would be induced during control processes, and being useful especially for correcting or inhibiting excessive deterioration of a vehicle behavior such as when a risk of rolling-over is detected. The device firstly judges if a possibility of rolling-over of the vehicle is high and calculates a target braking control amount for reducing the possibility of rolling-over in accordance with the result of the judgment of a possibility of rolling-over of the vehicle, where the target control amount when the possibility of rolling-over is high is set higher than when the possibility is low. Then, under control of the inventive control device, wheel braking force is controlled based upon the target braking control amount. After the starting of control of the wheel braking force, however, increasing and decreasing gradients of wheel braking force is restricted when a high possibility of rolling-over is judged.

19 Claims, 13 Drawing Sheets

VEHICLE BEHAVIOR CONTROL DEVICE

BACKGROUND OF THE INVENTION

1. Field of the Invention

The present invention relates to a device for controlling a behavior or an attitude of a vehicle such as an automobile, and more specifically, to such a device modified against a highly unstable behavior such as when a risk of rolling over a vehicle body is detected.

2. Description of Prior Art

A modern vehicle employs a system for controlling a behavior or an attitude of a running vehicle body. In such a vehicle, for instance, a braking system, in which braking force on each wheel can be independently increased and decreased, adjusts braking and/or traction force on wheels to modulate yaw moment and centripetal force on the vehicle body for maintaining a dynamical stability of the running vehicle under the control of an electronic control device. In accordance with such a system, which is often called "VSC (Vehicle Stability Control)" system, spinning (oversteering) and/or drifting-out (understeering), caused by excessive yaw moment around the centroid of a vehicle body and/or saturation of road reaction force (traction/braking force) on wheels, are effectively suppressed. So far, behavior control devices have been also developed against highly unstable or deteriorated behaviors, such as rolling over a turning vehicle, caused by abrupt steering or excessively high speed turning on a highly frictional road surface. An example of such devices is seen in Japanese Patent Laid-open Publication No. 11-11272, in which, in response to a detection of a risk of rolling-over based upon speed, steering angle and roll rate of a turning vehicle, the vehicle is braked to reduce centrifugal force exerted on its body, and thereby the risk of rolling-over can be decreased.

In conventional control strategies for vehicle behavior as described above, transient variation of braking force during correcting and maintaining a vehicle behavior is less considered. During controlling a vehicle behavior (a feedback control is usually employed for rendering an actual value in conformity with the corresponding target control amount.), braking force values or slip ratios on wheels are rendered close to their respective target amounts ensuring the maintaining of vehicle stability by cyclically incrementing or decrementing the braking force values. However, an increment and/or a decrement, i.e. a correction amount, in one cycle and/or a feedback gain are rather roughly determined. The behavior would be more deteriorated transiently during the control process when a correction amount applied to the corresponding control object is too large.

In this regard, when highly deteriorated condition, leading to the rolling-over of a vehicle body, is detected, it is possible that relatively strong force components, i.e. centrifugal force; yaw, roll and pitch moments, etc. have been already exerted on the vehicle body. In order to correct such a highly deteriorated behavior while reducing the risk of rolling-over, a rather large control amount is required against strong force and moment already exerted. However, such a rather large control amount induces a large variation of braking force on wheels, often resulting in the increase of rolling and pitching oscillations of a vehicle body.

Accordingly, a vehicle behavior control device may be improved, while taking into account transient braking force variation during control processes of correcting and maintaining of a vehicle behavior, especially under condition that a large control amount for correction is required against a highly deteriorated behavior, such as when a risk of rolling-over of a vehicle is detected. In this connection, since it becomes more difficult to correct a vehicle behavior having been already highly deteriorated (e.g. just before the rolling-over becomes inevitable), it is preferable to predict a future risk of behavior deterioration, and to correct the behavior in advance, thereby effectively reducing a risk of falling into ultimate deterioration, such as rolling-over of a vehicle body.

SUMMARY OF INVENTION

It is one object of the present invention to provide a vehicle behavior control device employing a novel control strategy, suppressing deterioration of a vehicle behavior which would be induced during behavior control processes. The vehicle to be equipped with the control device has wheels, a braking system including braking force generating apparatuses for the respective wheels. The inventive control strategy is useful especially for correcting or inhibiting excessive deterioration of a vehicle behavior such as when a risk of rolling-over is detected.

In one aspect of the present invention, the inventive device for controlling a behavior of a vehicle firstly judges whether or not a possibility of rolling-over of the vehicle is high and calculates a target braking control amount for reducing the possibility of rolling-over in accordance with the result of the judgment of a possibility of rolling-over of the vehicle. When the possibility of rolling-over is high, the target control amount is set higher than when the possibility is low. Then, under control of the inventive control device, wheel braking force is controlled based upon the target braking control amount. In this control process when a high possibility of rolling-over is judged, increasing and decreasing gradients of wheel braking force is restricted after the starting of control of the wheel braking force. Namely, the rate of the variation of braking force is decreased during correcting an actual braking force value to its target value.

As described above, in conventional behavior control device, while a target value itself is appropriately determined (using a certain theory of motion of a turning vehicle), an increment and/or a decrement of braking force for adjusting actually generated barking force value to its target value are not strictly regulated. The increment and/or decrement of braking force, if they are too large, would change an attitude of a vehicle body excessively, often inducing rolling and/or pitching oscillations and other behavior deterioration on a vehicle body during transition of braking force values or slip ratios toward their targets. When a target value is rather high such as when a risk of rolling-over of a vehicle is detected, these phenomena due to a rather large control amount are more possible. If rolling and/or pitching oscillations are increased, a risk of rolling-over could not be reduced.

For avoiding rolling/pitching oscillation and other deterioration after starting of control for correcting an actual value to its target value, in the present invention, increasing and decreasing gradients of wheel braking force are restricted as described. It should be note that this restriction is executed when a risk of rolling-over is detected and appropriately after the starting of the control of braking force, preferably after an actual value is close to its target value. This is because it is preferable to bring an actual value to its target value as soon as possible under normal running conditions or when the difference between the actual and target values is large.

According to another aspect of the present invention, in the control process of braking force when the possibility of rolling-over is judged high, firstly, it is judged whether or not a degree of rolling oscillation or pitching oscillation of a vehicle is high. Then, increasing and decreasing gradients of wheel braking force when the degree of rolling oscillation or pitching oscillation is high is restricted to a larger degree than when the degree of rolling or pitching oscillation is low, in order to reduce rolling/pitching oscillations during the control of correcting actual braking force to its target. In this connection, unless rolling/pitching oscillations are increased, an actual braking force value should be quickly brought to its target value appropriately determined for escaping from deteriorated condition in accordance with theories and experiments. Thus, the degree of the restriction of increasing and decreasing gradients of the wheel braking force may be varied depending upon the degree of the rolling and/or pitching oscillation. If the rolling/pitching oscillations are not large, the actual value will be brought to its target as quickly as possible. The degree of rolling and/or pitching oscillations may be determined based upon the amounts of rolling/pitching and these changing rates.

The restriction of increasing and decreasing gradients may be executed in various ways. For instance, when the wheel braking force is feedback-controlled based upon the target braking control amount and the corresponding actual amount (e.g. a target slip ratio and an actual slip ratio), feedback gain may be decreased for the restriction process. For a hydraulic braking system, duty ratios (the ratio of opening/closing) of braking pressure control valves, equipped for individual wheel cylinders, may be varied under the control of the inventive device.

In the inventive device, a target braking control amount for reducing a possibility of rolling-over a vehicle may be determined based upon a control parameter for stabilizing a vehicle behavior. Thus, the target braking control amount will be increased by increasing the behavior stabilizing control parameter. Since a possibility of rolling-over would be large upon unusually abrupt steering and/or excessive turning of a vehicle, the target braking control amount may be a target braking force value on a turning outside front wheel. The increase in the braking force on a turning outside front wheel generates anti-spin yaw moment (yaw moment in the direction opposite to the turning direction), which will reduce a yaw rate increased in the turning direction due to the abrupt and/or excessive turning, thereby suppressing the increase of the lateral force on the vehicle body in the turning outside direction (the centrifugal force) and reducing the possibility of rolling-over. More specifically, the target braking control amount may be a target slip ratio of a wheel, and the increasing and decreasing gradients of braking force on the turning outside front wheel will be restricted.

Further, a possibility of rolling-over depends upon a weight and/or a liability to rolling of a vehicle. Thus, based upon either or both of these parameters, a target braking control amount is preferably modified such that the target control amount is set larger as the vehicle weight is heavier and/or as the rolling liability is larger for adapting the target amount more appropriately to characteristics of various vehicles. The rolling liability may be measured based upon roll inertial moment of a vehicle.

A possibility or a risk of rolling-over may be detected based upon driving operation of a driver of the vehicle, using a steering angle and a steering speed as parameters, although such a risk may be also detected based upon vehicle behavioral condition such as a yaw rate, a lateral deceleration and vehicle speed. Rather, the detection based upon the driving operation advantageously allows starting the control for reducing a risk of rolling-over in advance, namely before a behavior has been highly deteriorated (Driving operation is considered as the input of a system of a vehicle behavior. The actual behavior variation, the response to the input, delays from the input.). Because of such advanced starting of the control, a target braking control amount can be set large enough to correct a behavior for reducing a risk of rolling-over.

Thus, in one of aspects of the present invention, a possibility of rolling-over of a vehicle based upon the behavior of the vehicle and a possibility of rolling-over of the vehicle based upon driving operation of a driver are judged; and the target control amount of braking force when the possibility of rolling-over of the vehicle based upon the driving operation is high is rendered larger than that when the possibility of rolling-over of the vehicle based upon the driving operation is not high even if the possibility of rolling-over of the vehicle based upon the vehicle behavior is high. For appropriately detecting a risk of rolling-over based upon driving operation of a driver, a steering angle, a steering speed and other parameters, such as a vehicle speed may be used. The restriction of increasing and decreasing gradients may be executed only when a possibility of rolling-over is judged as high based upon driving operation while taking into account the difference of allowable magnitudes of target braking control amounts before and after deterioration of a vehicle behavior.

In embodiments, criteria for steering operation for emergency avoidance may be advantageously used for detection of a high possibility of rolling-over based upon driving operation.

Other objects and advantages of the present invention will be in part apparent and in part pointed out hereinafter.

BRIEF DESCRIPTION OF THE DRAWINGS

In the accompanying drawings,

FIG. 7C also indicates condition in which steering operation for emergency avoidance is detectable.

DESCRIPTION OF PREFERRED EMBODIMENTS

Vehicle System

Figure 1:
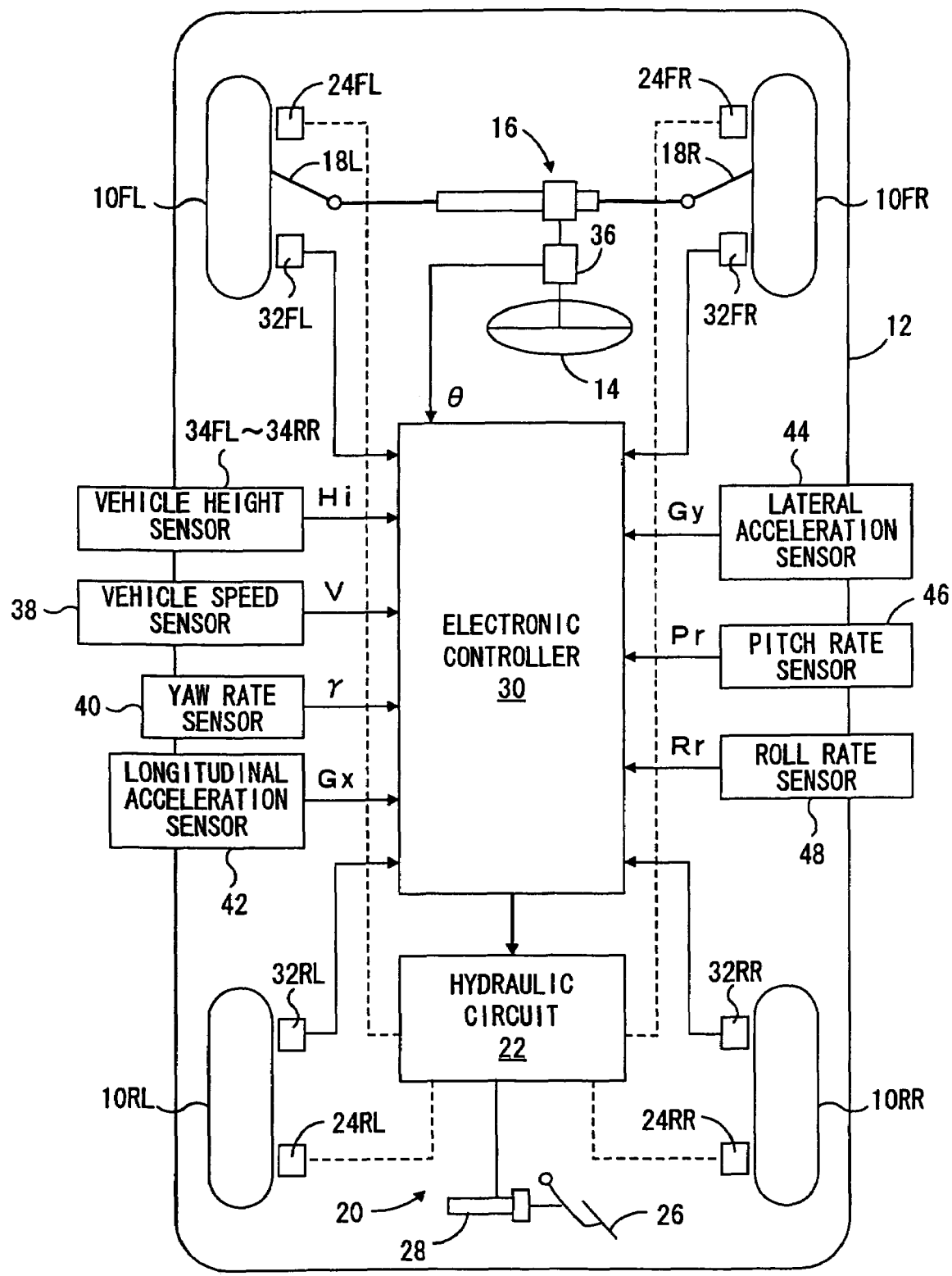
FIG. 1 is a diagrammatical view of a four wheel vehicle incorporating a vehicle behavior control device of a preferred embodiment according to the present invention.

FIG. 1 diagrammatically shows a four-wheel vehicle incorporating a vehicle behavior control device according to the present invention. The vehicle includes a vehicle body 12, front right wheel 10FR, front left wheel 10FL, rear right wheel 10RR and rear left wheel 10RL supporting the vehicle body 12 via the respective suspension means (not shown in the figure). The front right and front left wheels 10FR and 10FL are steered by a rack-and-pinion type power steering apparatus 16 according to a rotation of a steering wheel 14 by a driver via a pair of tie rods 18R and 18L. As usual, the vehicle is also provided with an engine adapted to output a driving torque according to a throttle valve opening in response to the depression of an acceleration pedal by the driver, and a transmission providing a driving force to the wheels through a differential gear system (not shown).

A brake system generally designated by 20 includes a hydraulic circuit 22, a brake pedal 26 adapted to be depressed by the driver, a master cylinder 28 for supplying a master cylinder pressure to the hydraulic circuit means 22 according to the depression of the brake pedal by the driver, and wheel cylinders 24$i$ ($i$=FL, FR, RL, RR) each adapted to apply a braking force to each corresponding one of the front right, front left, rear right and rear left wheels 10$i$ according to a supply of a hydraulic pressure thereto from the hydraulic circuit 22. The hydraulic circuit 22 also has connection with an oil reservoir, an oil pump, etc. and various valves. As known in the art, each wheel cylinder can be exposed to a high pressure region (the output of the oil pump) and a low pressure region (the oil reservoir) through a pair of pressure control valves, one for the high pressure side and the other for the low pressure side. Thus, braking pressures in the wheel cylinders, i.e. braking force on the individual wheels can be changed independently of one another by opening or closing the pair of the individual pressure control valves.

Electronic controller 30 incorporates a microcomputer which may be of an ordinary type including a central processor unit, a read only memory, a random access memory, input and output port means and a common bus interconnecting these elements (not shown) and function as the vehicle behavior control device according to the present invention or the inventive VSC device. As shown in FIG. 1, fed to the electronic controller 30 are signals indicating wheel speeds Vwi and vehicle height Hi, detected with wheel speed sensors 32$i$ and height sensors 34$i$, respectively, mounted on the wheels; signal indicating steering angle θ detected with a steering angle sensor 36 mounted on a steering shaft attached to the steering wheel 14; and signals of vehicle (body) speed V, yaw rate γ, a longitudinal acceleration Gx, a lateral acceleration Gy, a pitching rate Pr and a rolling rate Rr from the respective sensors 38, 40, 42, 44, 46 and 48. In addition to the above sensors, any other appropriate sensors may be provided for monitoring conditions of the vehicle behavior.

In the illustrated vehicle system, firstly, the VSC device calculates a target slip ratios of the respective wheels for a target braking control amount, using the above-listed parameters (signals). Then, the device adjusts an actual slip ratio to the corresponding target value on each wheel, thereby modulating the distribution and/or balance of road reaction force on tires to generate yaw moment for correcting or stabilizing the behavior or attitude of the vehicle (against behavior deterioration especially during turning). In the present hydraulic braking system, the VSC device repetitively executes the opening and closing of the pair of the pressure control valves for each wheel to expose the corresponding wheel cylinder to the high or low pressure region intermittently, thereby varying an actual braking pressure in the corresponding wheel cylinder. The increasing/decreasing gradient, i.e. the variation rate, of a braking pressure, i.e. a slip ratio can be changed by modulating a duty ratio, i.e. the ratio of durations of opening of the control valve per unit time. When the increasing/decreasing gradient is to be restricted, the duty ratio of the corresponding increasing/decreasing pressure control valve is decreased.

General Flow of Operation of the Inventive Device

In the operation of the inventive VSC device, briefly, during the running of a vehicle, when a high possibility of rolling-over is detected based upon driving operation of the driver of the vehicle, a braking force value, i.e. a slip ratio, on the turning outside front wheel is adjusted to a high target value (target braking control amount). However, the increasing and decreasing gradients of the slip ratio is restricted after the starting of the process of controlling or adjusting the slip ratio in order to avoid rolling/pitching oscillations due to the application of a correction to the actual slip ratio, i.e. the transient variation of braking force. When a possibility of rolling-over detected based upon the driving operation is low, normal operation for stabilizing a vehicle behavior is executed without any restriction of increasing and decreasing gradients of a slip ratio or braking force.

Figure 2:
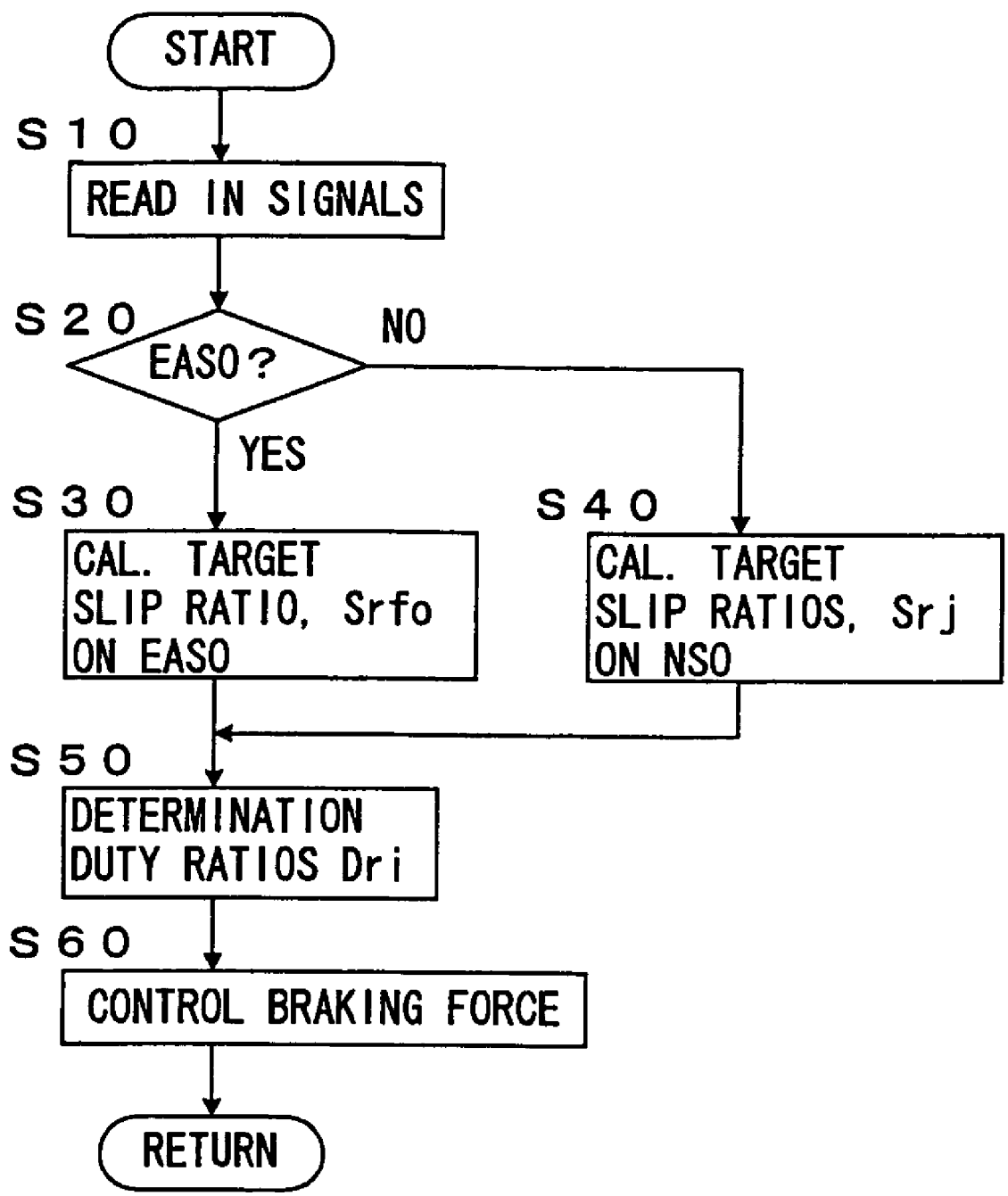
FIG. 2 is a flowchart showing a main routine of behavior control in the preferred embodiment according to the present invention.

FIG. 2 shows a general flow of the operation of an embodiment of the inventive VSC device. This control flow is started by a closure of an ignition switch (not shown in FIG. 1) and cyclically repeated at a cycle time such as tens of milli-seconds during the operation of the vehicle. As shown, firstly, in step 10, the signals shown in FIG. 1 are read in.

Then, a possibility of rolling-over of the vehicle is determined based upon driving operation currently executed by the driver in Step 20, where a criterion for detecting "Steering Operation for Emergency Avoidance (EASO)" may be used for judging whether a possibility of rolling-over is high or low. EASO is operation in which a driver quickly and excessively rotates a steering handle, such as for avoiding collision with an obstacle in the traveling course of the vehicle. Such EASO may be considered as an origin of rolling-over during turning a vehicle. EASO generates excessive yaw moment starting the turning of the vehicle body while increasing a yaw rate, leading to the increase of the centrifugal force exerted on the vehicle and increasing a possibility of rolling-over. Thus, the detection of EASO, in which a steering angle and its speed are used for parameters, advantageously allows to predict future deterioration of the vehicle behavior, and accordingly the detection of EASO is useful for judging the necessity of control for reducing a possibility of rolling over before the vehicle behavior is highly deteriorated. The details of the ways detection of EASO are described later.

When EASO is detected (i.e. a possibility of rolling-over is judged high), a target braking control amount, i.e. a target slip ratio of a turning outside front wheel for reducing a possibility of rolling-over is calculated in Step 30. Otherwise (i.e. a possibility of rolling-over is not judged as high), target slip ratios is calculated in Step 40 in accordance with normal control processes for stabilizing a vehicle behavior. Then, based upon the target slip ratios calculated in Step 30 or 40, duty ratios for the pressure control valves in the hydraulic circuit 22 are determined in Step 50, where the duty ratios are modulated for restricting the increasing/decreasing gradient of braking force only when EASO is detected. And, in Step 60, the pressure control valves are operated with the resultant duty ratios to increase or decrease braking force on the wheels, and the process is returned to START. The details in each of the steps are described in the followings.

Calculation of Target Slip Ratio upon EASO

In the present embodiment, in order to reduce a high possibility of rolling-over detected in Step 20, a slip ratio on a turning outside front wheel is increased to generate anti-spin yaw moment. This anti-spin yaw moment will reduce the yaw rate in the turning direction, i.e. cancel the effect of EASO, thereby suppressing the increase of the centrifugal force exerted on the vehicle body.

In step 30, i.e. when EASO is detected, a target slip ratio Srfo of the turning outside front wheel is calculated as:

$$Srfo = Kw \cdot Ki \cdot Srfo' \quad (1),$$

where Srfo' is a basic value of slip ratio; Kw, a modification factor with respect to a vehicle weight W; and Ki, a modification factor with respect to a vehicle roll inertial moment I.

The basic value Srfo' may be appropriately predetermined to a large value, e.g. a nearly maximum value available in the braking system 20 in FIG. 1 for effectively correcting the behavior being deteriorated. It should be noted that the basic value Srfo' may be advantageously set higher than any values which can be set in a normal behavior control process in Step 40 as described later. This is because, at the detection of EASO, the vehicle behavior has not been highly deteriorated so that further available road reaction force on wheels is still enough to generate high braking force.

Figure 3A:
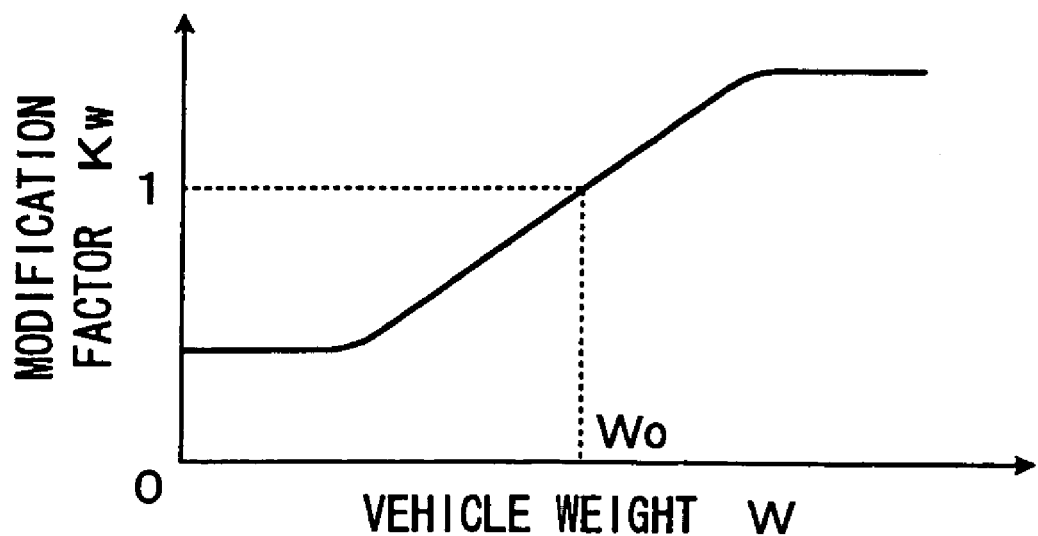
FIGS. 3A and 3B are maps, used in Step 30 in FIG. 2, for calculating factors Kw and Ki for the modification of a basic target slip ratio, Srfo', with a vehicle weight W and a roll inertial moment I, respectively.
Figure 3B:
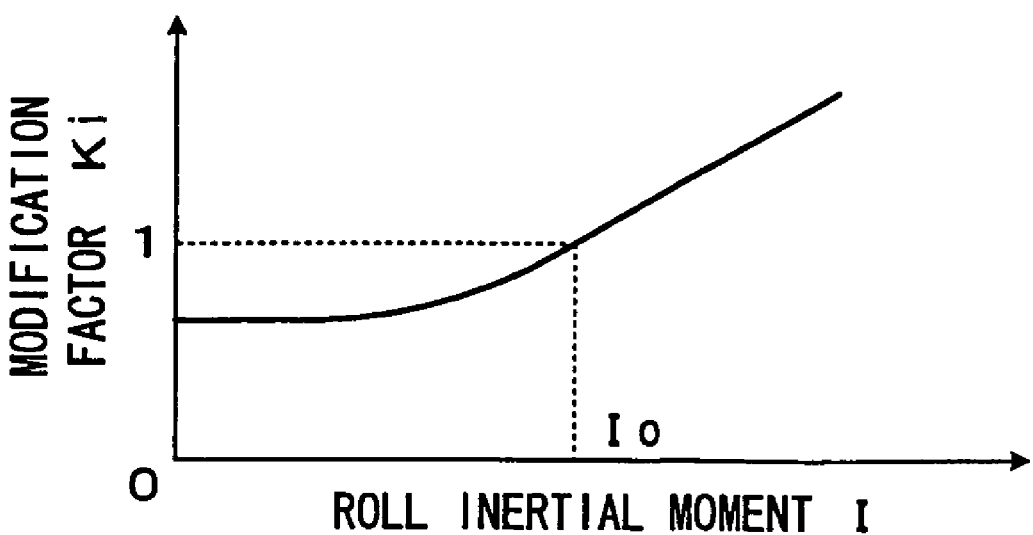

Force and moment, to be required for correcting and/or inhibiting behavior deterioration (the increase of the centrifugal force), will increase with a vehicle weight and inertial moment. Thus, the (final) target slip ratio Srfo is obtained by modifying the basic value Srfo' with respect to the vehicle weight and roll inertial moment as seen from the expression (1). Kw is determined as a function of vehicle weight W using a map in FIG. 3A, where the weight W is estimated based upon a sum of low-pass filtered data of vehicle height Hi obtained with the sensors 34$i$ when the vehicle is stopped and running at a low speed. Wo is a weight of a vehicle under a standard condition. Ki is determined as a function of roll inertial moment I, using a map in FIG. 3B, where the roll inertial moment is estimated based upon a differential of a roll rate data Rr obtained with roll rate sensor 48. Io is roll inertial moment of a vehicle under a standard condition. The target slip ratio may be modified with the other parameters, such as yaw and/or pitch inertial moment, a vehicle speed, etc.

Accordingly, when EASO is detected, braking force, not only strong but also adapted to various characteristics of a vehicle, is generated for suppressing a behavioral deterioration of the vehicle.

Calculation of Target Slip Ratio upon Non-ESO

When no EASO is detected, a conventional process may be executed for calculating target slip ratios on wheels.

For example, firstly, in order to estimate a vehicle behavior, Spin value SV and Drift value DV are firstly determined as follows:

$$SV = K1 \cdot \beta + K2 \cdot dVy; \text{ or } = K1 \cdot \beta + K2 \cdot d\beta \quad (2)$$

$$DS = \gamma t - \gamma; \text{ or } = H \cdot (\gamma t - \gamma)/V \quad (3),$$

where $\beta$ is a slip angle of a vehicle; dVy, a side sliding acceleration of the vehicle; d$\beta$, a time differential of $\beta$; K1, K2, appropriate weight factors; $\gamma t$, yaw rate estimated from the vehicle speed V and steering angle $\theta$; $\gamma$, an actual yaw rate; H, a wheel base. In those expressions, the parameters are defined as positive in the forward and leftward directions. [dVy is given from the deviation between a lateral acceleration Gy and a product of yaw rate $\gamma$ and vehicle speed V: Gy$-\gamma \cdot$V. $\beta$ is obtained by the ratio of side sliding speed to longitudinal speed: Vy/Vx, where Vx=V and Vy is given by integrating dVy. $\gamma t$ is obtained from $\gamma t = V \cdot \delta / \{(1+ Kh \cdot V^2) \cdot H\} \times 1/(1+Ts)$, where $\delta$ is an actual steering angle, based upon the steering angle $\theta$; Kh, a stability factor; T and s, a time constant and frequency parameter in Laplace transformation. The derivation of expressions (2) and (3) are described elsewhere.]

Then, Spin condition value SS and Drift-out condition value Ds are defined as:

$$SS = \pm SV \quad (4)$$

$$DS = \pm DV \quad (5)$$

(+: during left turning; −: during right turning. SS, DS is defined as 0 if these are negative.)

Briefly, SS and DS each indicate degrees of spinning and drifting-out, respectively (The more deteriorated a behavior is, the larger either of the values is.).

Then, using the resultant condition values, target braking force for wheels are calculated as follows:

Fsfo=Fssfo

Fsfi=0

$$Fsro = (Fsall - Fssfo) \cdot (1 - Ksri) \quad (6)$$

Figure 4A:
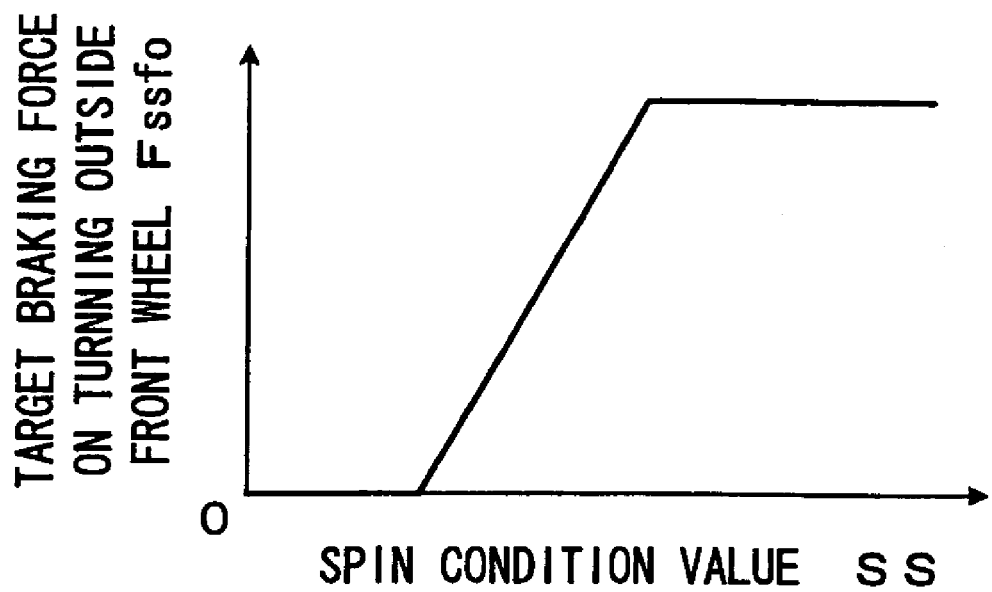
FIGS. 4A and 4B are maps, used in Step 40 in FIG. 2, for calculating force components, Fssfo and Fsall, with spinning and drifting-out conditional values, SS and DS, respectively.
Figure 4B:
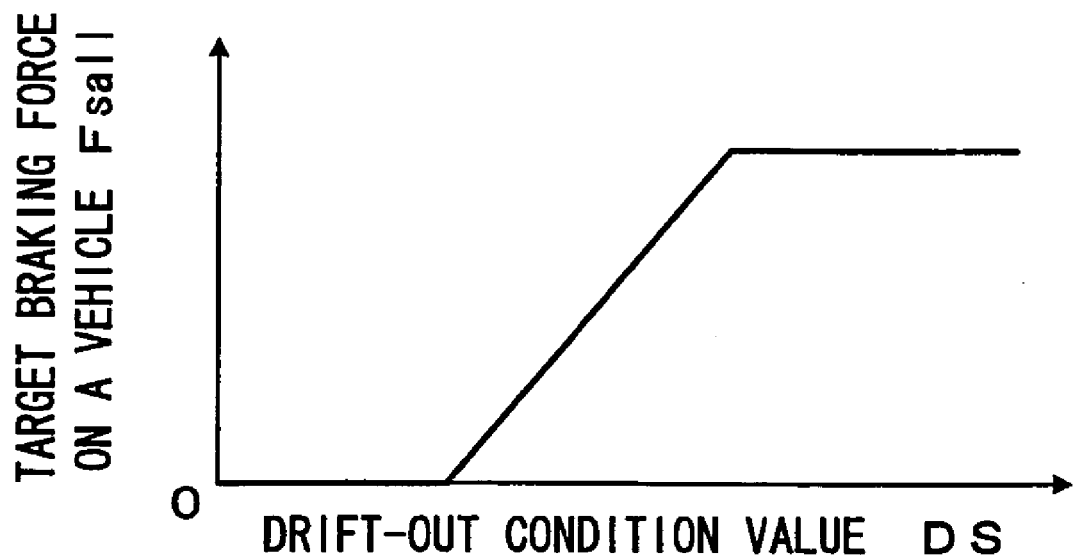

Fsri=(Fsall−Fssfo)·Ksri where Fsj, (j=fo, fi, ro, ri: turning outside and inside front, turning outside and inside rear) are target braking force values for the respective wheels. Fssfo is determined as a function of SS, using a map of FIG. 4A. Fsall is determined as a function of DS, using a map of FIG. 4B. Ksri is an appropriate distribution factor for rear wheels (a positive constant typically exceeding 0.5.). If a calculated value of Fsj is negative, it will be nullified. The above-defined force distribution generates anti-spin or anti-drift-out yaw moment as known in the art (The detailed effects of this force distribution are described elsewhere.).

Then, the resultant target force values are each converted into target values of slip ratios of the respective wheels in a way known in the art.

Further, if spinning condition is rather high on high frictional road a friction on the road is rather high (e.g. if the target slip ratio of the turning outside front wheel and the (absolute) lateral acceleration Gy each exceed the respective reference values), rather strong force and moment have been already exerted on the vehicle body. In such a case, the target slip ratios Srj may be increased as follows: Srj←Kg·Srj, where Kg is a positive constant between 1 and 1.5, for correcting the vehicle behavior, and thereby reducing a possibility of rolling-over if any, with anti-spin moment higher than normal anti-spin moment.

Determination of Duty Ratio (Increasing and Decreasing Gradients of Braking Force)

In the present embodiment, in order to adjust an actual slip ratio to the corresponding target value, the deviation of the actual value from the target value is fed back to the input of a braking force generating apparatus or a wheel cylinder (feedback control). To do this, duty ratios for pressure control valves for the wheel cylinders are calculated. In this regard, as described above, the duty ratio for the turning outside front wheel is modulated for restricting the increasing and decreasing gradients of braking force when EASO is detected.

Figure 5A:
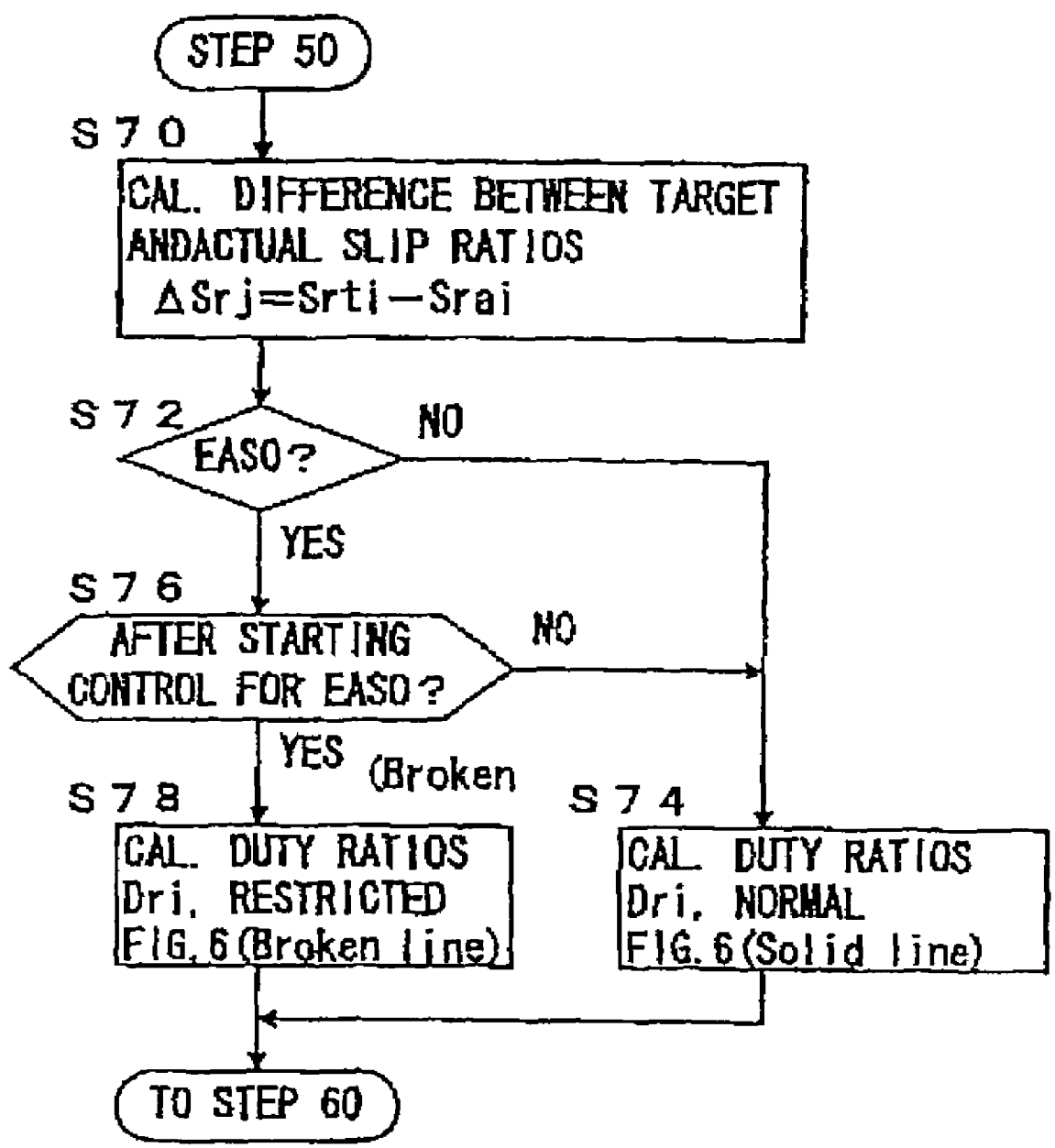
FIG. 5A is a flowchart in one embodiment of determination of duty ratios in Step 50 in FIG. 2.

FIG. 5A shows a control flow in an embodiment of the way of determination of duty ratios (in Step 50 in FIG. 2).

Referring to FIG. 5A, in Step 70, the difference between target and actual slip ratios on each wheel is determined. In this step, firstly, the current turning direction is judged as left or right with the sign of yaw rate or steering angle, etc., and then, target slip ratios calculated as the values for turning outside and inside, front and rear wheels in Step 30 or 40 are assigned to target slip ratios for left and right, front and rear wheels as follows:

Srtfr=Srfo; Srtfl=Srfi; Srtrr=Srro; Srtrl=Srri [during left turning]

Srtfr=Srfi; Srtfl=Srfo; Srtrr=Srri; Srtrl=Srro [during right turning]

(the turning outside and inside wheels are right and left wheels during left turning, and vice versa during right turing.)

Then, the difference ΔSri between the target slip ratio Srti and actual an slip ratio Srai on each wheel is calculated as $$\Delta Sri = Srti - Srai (i = fl, fr, rl, rr). \quad (7)$$

where the actual slip ratio Srai on each wheel may be calculated from wheel speed Vwi from the sensors 32*i* and a vehicle speed V from the sensor 38.

Figure 6:
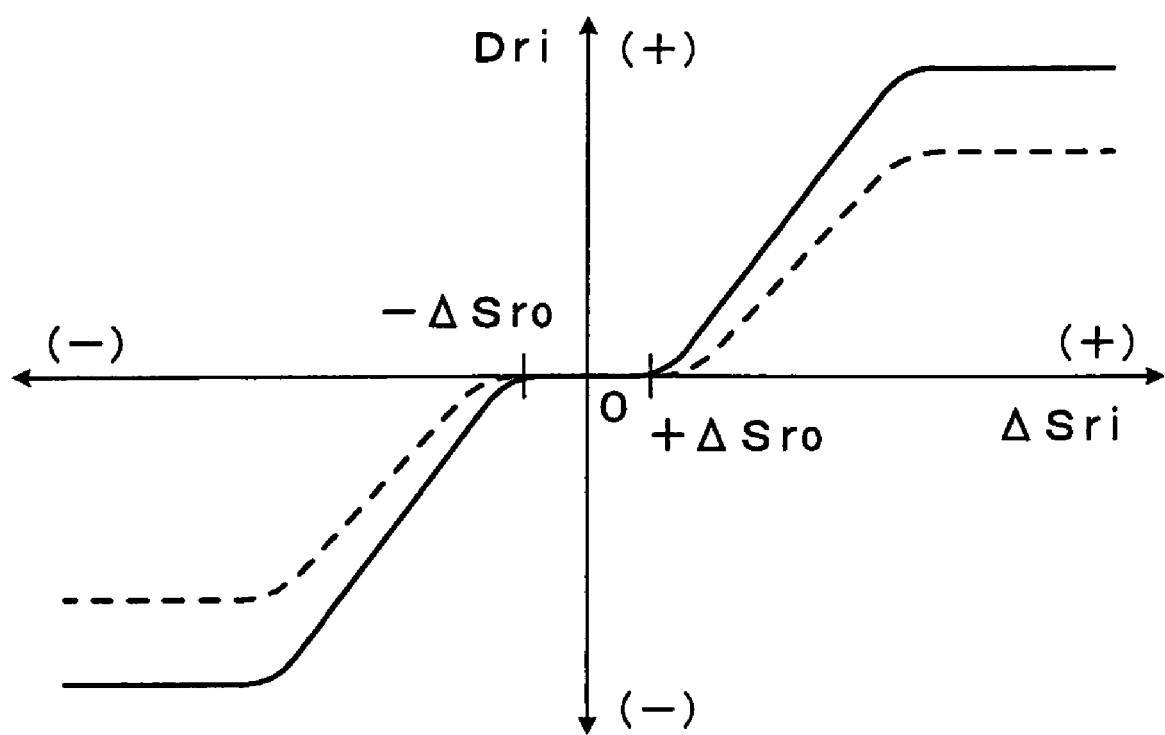
FIG. 6 is maps, used in FIGS. 5A and 5B, for determining duty ratios from the difference between target and actual slip ratios.

Next, if EASO has not been detected in Step 20, i.e. the target slip ratios are calculated in Step 40 in accordance with a normal behavior control, duty ratio of either of the pair of pressure control valves for each wheel is determined as a function of the difference between the target and actual slip ratios (in Steps 72 and 74), using a map as indicated with the solid line in FIG. 6. In this case, braking pressure will be increased (ΔSri>0: pressure increasing mode) or decreased (ΔSri<0: pressure decreasing mode) by opening the corresponding pressure control valve at a duty ratio appropriately determined so as to cancel the deviation of the actual slip ratio from its target value as soon as possible, without control hunting, in a manner known in the art. If the difference ΔSri is very close to zero, none of the valves is opened as shown by the solid line around the 0 point (within ±ΔSr0) in FIG. 6 (pressure holding mode).

If EASO has been detected in Step 20, i.e. the target slip ratio is calculated in Step 30, the duty ratio for the turning outside front wheel is determined using a map as indicated with the broken line in FIG. 6 (Steps 72 and 78). In this case, as seen from FIG. 6, the duty ratio is decreased so that the increasing or decreasing gradient of the slip ratio is restricted for avoiding rolling/pitching oscillation of the vehicle body due to transient braking force variation during the canceling of the difference between the actual and target slip ratios. In this regard, just after EASO, namely, before starting the control process of the slip ratio of the turning outside front wheel, it is anticipated that the actual value is far away from its target value (The difference between target and actual values is relatively large.). Thus, after step 72, whether or not the control using the target value calculated in Step 30 has been started is judged in Step 76, and, if it has not, the duty ratio is determined without the restriction in Step 74.

According to the restriction of the increasing/decreasing gradient of the slip ratio, as described above, the amplitude of braking force, varied around its target value every control cycle for correcting slip ratio to its target, is reduced, suppressing the variation of force or moment alternatively exerted on the vehicle body to induce unwanted increase of rolling/pitching oscillation. In this regard, the target slip ratio, namely braking force when EASO is detected will be relatively high, as compared to the values determined in the normal process of Step 40. In the range of such a higher slip ratio, in general, the changing ratio of a slip ratio to braking pressure is higher than that in the range of a lower slip ratio, resulting in that a small variation of braking pressure can induce rather large variation of braking force. Thus, the restriction of the increasing/decreasing gradient of the slip ratio is much effective for avoiding rolling/pitching oscillation under condition that a higher target slip ratio is set out.

Figure 5B:
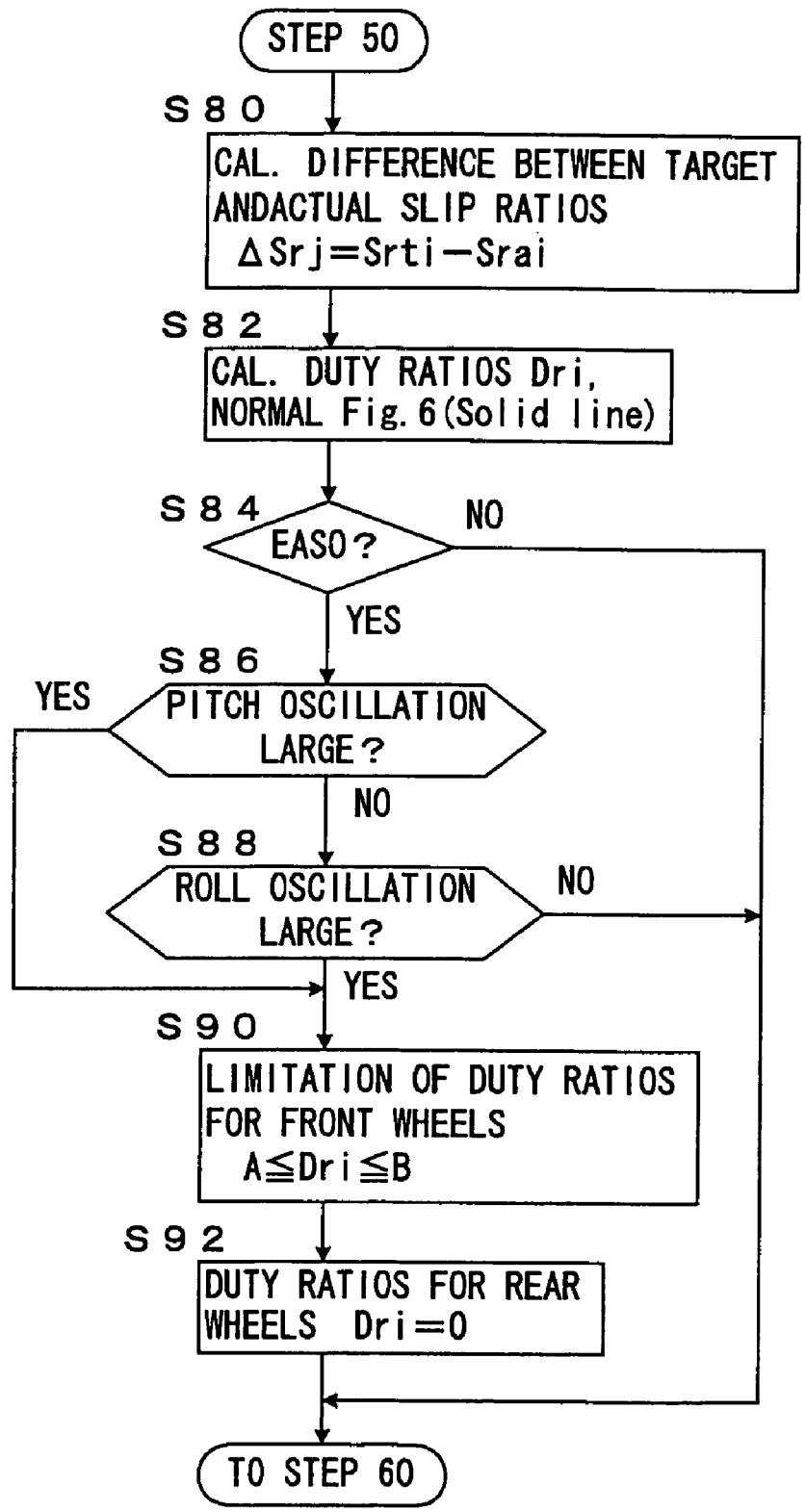
FIG. 5B is a flowchart in an alternative embodiment of determination of duty ratios in Step 50 in FIG. 2.

In view of the purpose of the restriction of the duty ratio for the turning outside front wheel when EASO is detected as described above, an alternative process of determination of duty ratios may be executed as shown in FIG. 5B.

In FIG. 5B, the difference between the target and actual slip ratios on each wheel is determined as in Step 70 in FIG. 5A (Step 80), and duty ratio for each wheel is once determined using the map of the solid line in FIG. 6 (Step 82). Then, if EASO has not been detected (Step 84), no restriction of the duty ratio is executed.

If EASO has been detected (Step 84), whether or not either of rolling or pitching oscillation has been large is judged through Steps 86 and 88. In these judgments, for example, when a weighted sum of the magnitudes of a rolling (pitching) amount, calculated based upon the vehicle heights Hi monitored on each wheel, and a roll (pitch) rate, monitored with the sensor 48 (46), exceeds the corresponding reference value, the oscillation is judged as high. If the oscillations in both rolling and pitching directions are low, no restriction of duty ratio is executed.

If either of the oscillation has been large, the duty ratio Drfl or Drfr of a front wheel is limited within the range between a lower limit A (negative) and an upper limit B (positive): if Drfl(fr)<A, then Drfl(fr) is set to A; if Drfl(fr)>B, Drfl(fr) is set to B (Step 90). The limits A and B may be determined fixedly or variably based upon roll inertial moment I and the other rolling and pitching parameters such as roll/pitching angles, rates. Preferably, the limits A and B are more away from zero as a roll inertial moment increases. Then, in step 92, the duty ratios of the rear wheels are set to zero.

According to the process in FIG. 5B, as long as the rolling/pitching oscillations are small, a control speed for canceling the difference between actual and target values is maintained at a level under the normal control process in absence of EASO.

In the above-mentioned embodiments in FIGS. 5A and 5B, the duty ratios may be determined after a feedback amount is calculated as $Kf \cdot \Delta Sri$, where Kf is a feedback gain. In such a case, Kf is reduced upon the restriction of the increasing/decreasing gradients of braking force.

Detection of EASO

As described above, in the present embodiment, a possibility of rolling-over is determined in Step 20 in FIG. 2 by detecting EASO. It should be noted that the centrifugal force has not been increased yet and the vehicle behavior has not been highly deteriorated at the detection of EASO, i.e. just after the steered wheels are rotated. Thus, in the present embodiment, the control for reducing a possibility of rolling-over can be started in advance.

There are several ways of detection of EASO. In the followings, several examples are explained about in detail. In this connection, in all the examples as shown below, EASO is not judged (a normal steering condition, NSO, is judged) when a vehicle speed V is low, i.e. V does not exceed a reference value Vo. This is because there is no risk of rolling-over during turning if the speed is low.

The First Example of Detection of EASO

Figure 7A:
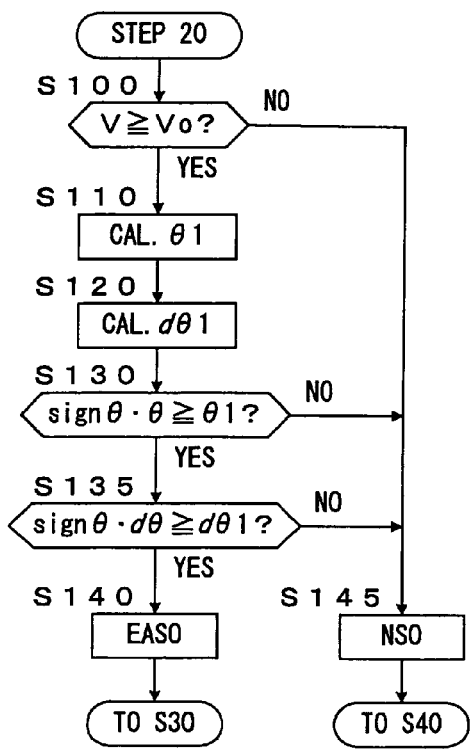
FIG. 7A is a flowchart in the first embodiment of detection of steering operation for emergency avoidance.
Figure 7B:
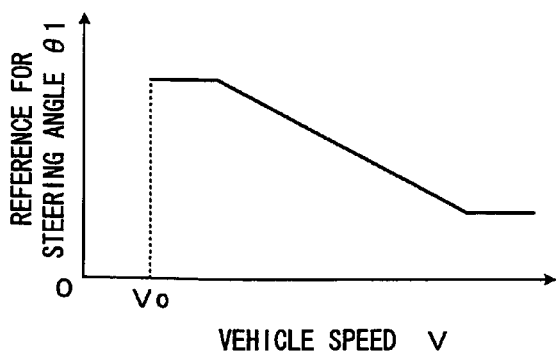
FIGS. 7B-7C, maps for determining reference values for detection parameters.
Figure 7C:
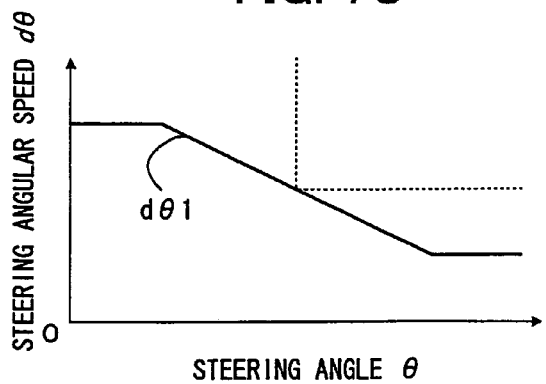

FIG. 7A shows a flow of a process for detecting EASO. In this example, after judgment of a vehicle speed V (Step 100), a reference value $\theta1$ for a steering angle $\theta$ is determined as a function of the vehicle speed V, using a map in FIG. 7B (Step 110) and a reference value $d\theta1$ for a steering angular speed $d\theta$ (the rotational speed of the steering angle) is determined as a function of the steering angle $\theta$, using a map as indicated with a solid line in FIG. 7C (Step 120). Then, EASO is judged when the absolute value of the steering angle $\theta$: $\text{sign}\theta \cdot \theta$, where $\text{sign}\theta$ is the sign of $\theta$ (±1), and the product of $\text{sign}\theta$ and $d\theta$: $\text{sign}\theta \cdot d\theta$ each exceed the respective reference values $\theta$ and $d\theta1$ (S130, S135). If the steering wheel rotates in the direction opposite to the turning direction of the vehicle, $\text{sign}\theta \cdot d\theta < 0 < d\theta1$. If either of the parameters $\theta$ or $d\theta$ does not exceed the corresponding reference value $\theta1$ or $d\theta1$, NSO is judged.

In the above exemplary process, it should be noted that the reference value $\theta1$ decreases together with the increase of the vehicle speed V. This is because unallowable centrifugal force will be generated at a smaller angle as the vehicle speed increases. Further, it should be noted that the angular speed reference value $d\theta1$ decreases together with the increase of the steering angle, so that EASO can be detected in the region above the solid line in FIG. 7C, wider than when $d\theta1$ is determined irrespective of a steering angle $\theta$. In the latter case, EASO can be detected only in the region higher than the broken lines in FIG. 7C.

The steering angle reference value $\theta1$ may be determined as a function of yaw rate, lateral acceleration, etc. Further, it may be so designed that the angular speed reference value $d\theta1$ is determined based upon the vehicle speed, yaw rate, lateral acceleration, etc. and the steering angle reference value $\theta1$ is determined with the angular speed $d\theta$. In addition, judgment of a lateral acceleration Gy may be also done in the process, in which EASO is judged when Gy also exceeds a fixed positive reference value. Sensing Gy at this stage allows the monitoring of frictional condition on a road surface before the vehicle behavior is highly deteriorated. If Gy is low, the friction on the road surface can be considered as not too high.

The Second Example of Detection of EASO

Figure 8A:
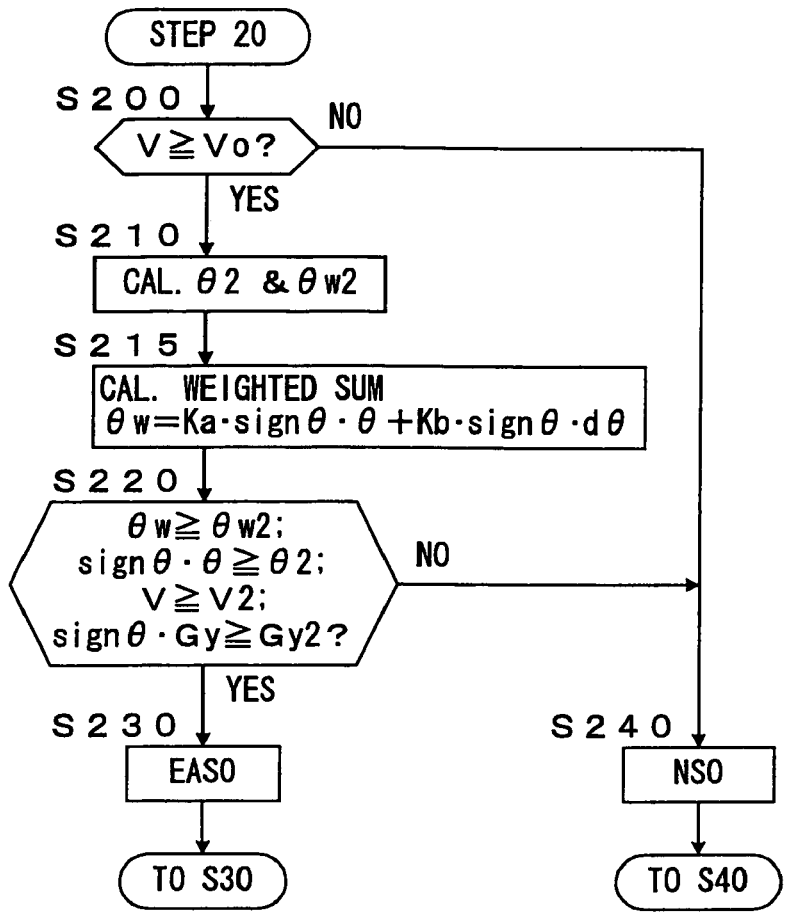
FIG. 8A is a flowchart in the second embodiment of detection of steering operation for emergency avoidance.

FIG. 8A shows a flow of a process in the second example for detecting EASO. In this example, EASO is detected using a weighted sum of a steering angle and its angular speed, instead of the angular speed.

Figure 8B:
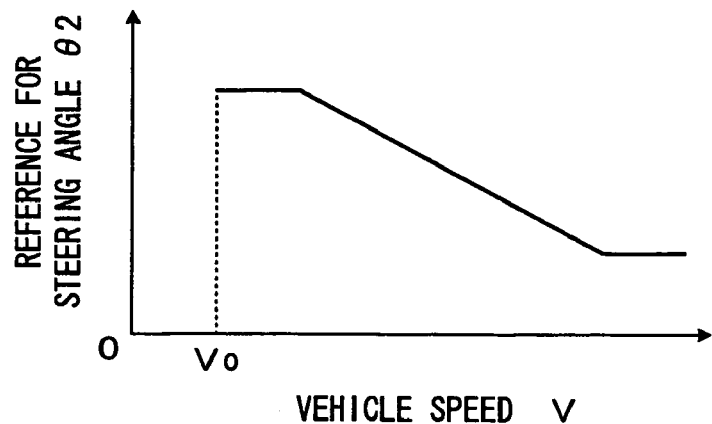
FIGS. 8B-8C, maps for determining reference values for detection parameters.
Figure 8C:
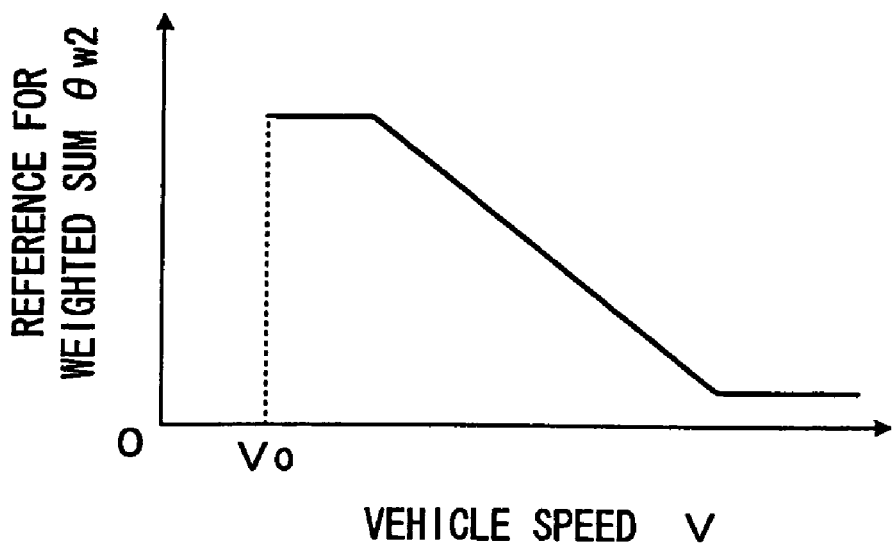
Figure 8D:
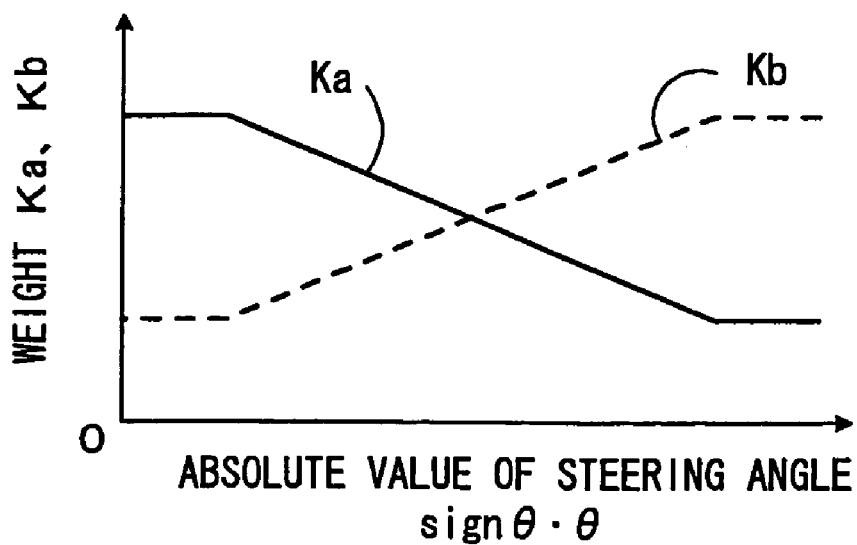
FIG. 8D, maps for determining weight factors for a weighted sum of a steering angle and its speed.

Referring to the flow in FIG. 8A, after the judgment of a vehicle speed V (Step 200), reference values $\theta2$, $\theta w2$ for a steering angle $\theta$ and a weighted sum $\theta w$ of the steering angle and its angular speed, respectively, are determined in Step 210 as functions of the vehicle speed V, using maps in FIGS. 8B and 8C. Then, in Step 215, the weighted sum $\theta w$ is calculated as follows:

$$\theta w = Ka \cdot \text{sign}\theta \cdot \theta + Kb \cdot \text{sign}\theta \cdot d\theta, \tag{8}$$

where Ka and Kb are weights determined as functions of the absolute value of the steering angle ($\text{sign}\theta \cdot \theta$), using a map in FIG. 8D. As seen from FIG. 8D, as the absolute value of the steering angle increases, Ka and Kb are set to decrease and to increase, respectively. This is because (1) when the steering angle is small, the contribution of the angular speed is to be small for avoiding a premature starting of the control process for reducing a possibility of rolling-over in Step 30; (2) when the steering angle is large, the control process should be started at a low angular speed.

Then, in Step 220, when the following conditions are satisfied, EASO is judged:

$$\theta w \geq \theta w2; \tag{9a}$$

$$\text{sign}\theta \cdot \theta \geq \theta2; \tag{9b}$$

$$V \geq V2; \tag{9c}$$

$$\text{sign}\theta \cdot Gy \geq Gy2, \tag{9d}$$

where V2 and Gy2 are reference values for the vehicle speed V and lateral acceleration Gy. If either of the conditions is not satisfied, NSO is judged.

The reference values $\theta w2$, $\theta 2$ and the weights K1 and K2 may be determined as a function of yaw rate, lateral acceleration, etc. Further, these values may be modified based upon roll inertial moment (a liability to rolling) and/or a vehicle weight and/or height. Under certain running conditions, the condition (9c) or (9d) may be omitted.

The Third Example of Detection of EASO

Figure 9A:
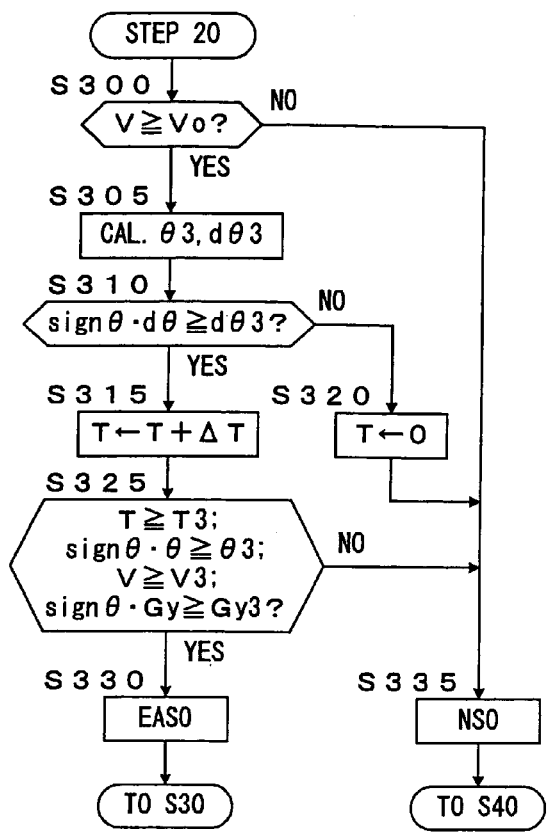
FIG. 9A is a flowchart in the third embodiment of detection of steering operation for emergency avoidance.

FIG. 9A shows a flow of a process in the third example for detecting EASO. In this example, EASO is judged when a steering angular speed is kept above a certain level.

Figure 9B:
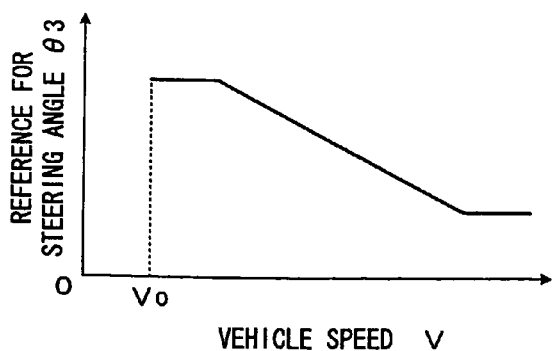
FIGS. 9B-9C, maps for determining reference values for detection parameters.
Figure 9C:
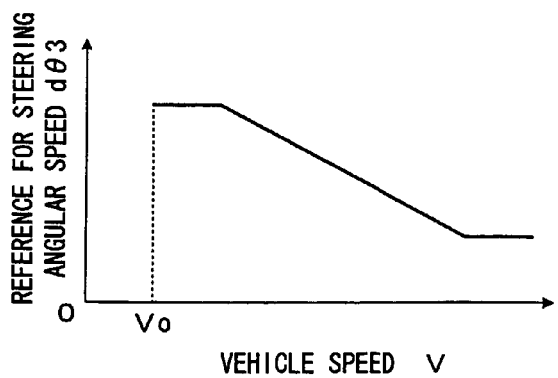

Referring to the flow in FIG. 9A, after the judgment of a vehicle speed V (Step 300), reference values $\theta3$, $d\theta3$ for a steering angle $\theta$ and its speed $d\theta$ are determined as functions of the vehicle speed V, using maps in FIGS. 9B and 9C (step 305). Then, when the angular speed $d\theta$ exceeds $d\theta3$: $\text{sign}\theta \cdot d\theta \geq d\theta3$, a time count T is started from 0 in Step 310. The time count T is incremented by $\Delta T$ in step 315 every cycle until T exceeds a reference period T3 or $\text{sign}\theta \cdot d\theta$ falls below $d\theta3$ (Step 320).

When the time count T exceeds T3 and the following conditions are satisfied (Step 325), EASO is judged (S330). Otherwise, NSO is judged (Step 335).

$$\text{sign}\theta \cdot \theta \geq \theta3 \tag{10a}$$

$$V \geq V3 \tag{10b}$$

$$\text{sign } \theta \cdot Gy \geq Gy3 \quad (10c),$$

where V3 and Gy3 are reference values for the vehicle speed V and lateral acceleration Gy.

The reference values dθ3, θ3, T3 may be determined as a function of yaw rate, lateral acceleration, etc. Further, these values may be modified based upon roll inertial moment (a liability to rolling) and/or a vehicle weight and/or height. Under certain running conditions, the condition (10b) or (10c) may be omitted.

The Fourth Example of Detection of EASO

Figure 10A:
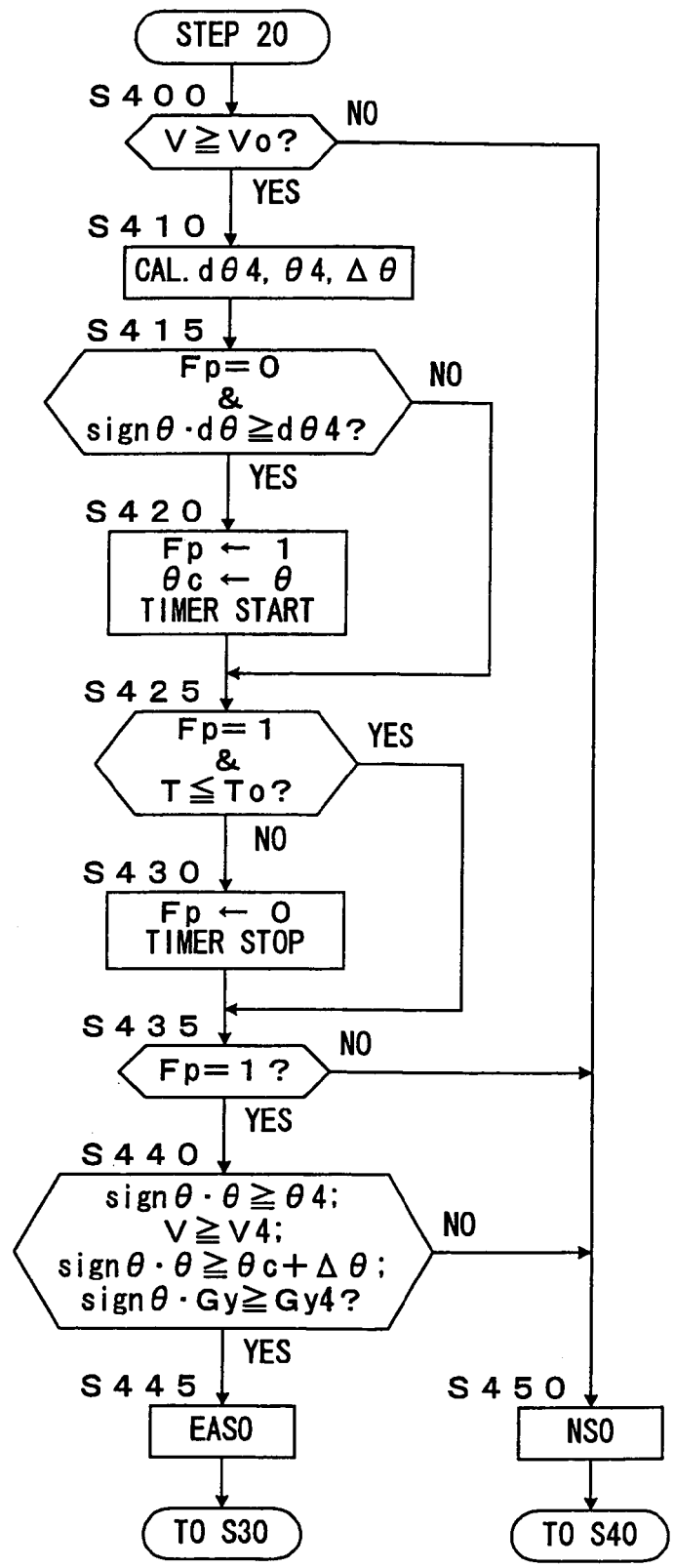
FIG. 10A is a flowchart in the fourth embodiment of detection of steering operation for emergency avoidance.

FIG. 10A shows a flow of a process for detecting EASO in the fourth example of detection of EASO. In this exemplary process, firstly, it is judged whether or not a steering angular speed dθ exceeds a reference value dθ4: dθ≧dθ4. If it does, EASO will be judged when a steering angle θ, an increment from the steering angle θ in the turning direction, the vehicle speed V and a lateral acceleration Gy each exceed the respective reference values within a predetermined time period To from the time point of the satisfaction of dθ≧dθ4.

Figure 10B:
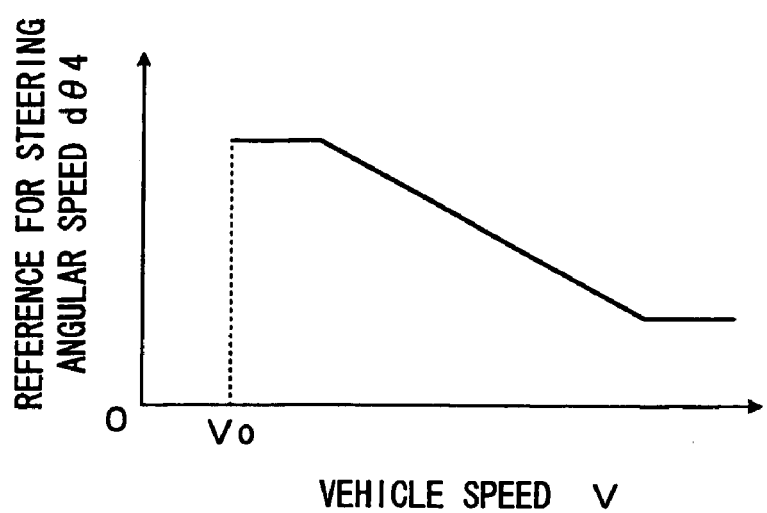
FIGS. 10B-10D, maps for determining reference values for detection parameters.
Figure 10C:
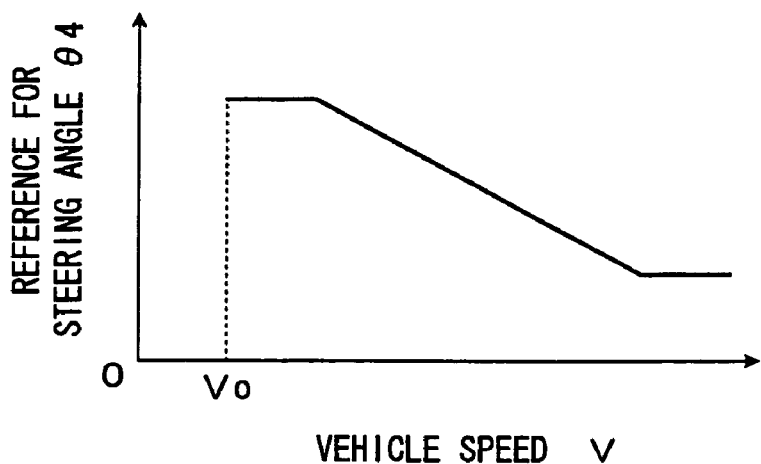
Figure 10D:
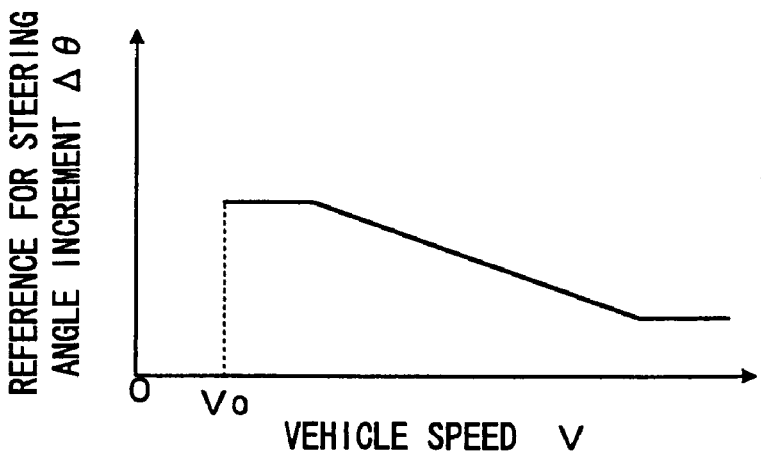

More specifically, referring to FIG. 10A, after the judgment of the vehicle speed V (Step 400), the reference values dθ4, θ4 and Δθ for the angular speed dθ, the steering angle θ and the angular increment from the time of the satisfaction of dθ≧dθ4 are determined as functions of the vehicle speed V, using maps in FIGS. 10B, 10C and 10D, respectively (Step 410).

Then, it is judged in Step 415 whether or not (1) dθ≧dθ4 and (2) Fp=0, where Fp is a flag being set to 0 if a timer for measuring the period To does not operate and set to 1 if the timer has operated. Before the condition: dθ≧dθ4 is satisfied, always Fp=0. If dθ≧dθ4, the timer is started (and thus, Fp is set to 1), and the current steering angle θ is recorded as θc in Step 420. Steps 425, 430, 435 are for checking that the period To has lapsed after the angular speed dθ exceeds its reference value dθ4. During the repetitive whole processes in FIG. 2, once the timer is started, it is checked in Step 425 if the count of the timer T exceeds To. If the period To has not lapsed: T≦To, while bypassing Step 430 and passing through Step 435 in which it is judged if Fp=1, it is judged in Step 440 if EASO is executed as described later. If the period To has lapsed: T>To, the timer will be stopped and Fp is set to 0. Then, through Step 435, NSO is judged. When dθ≧dθ4 is not satisfied in Step 415, NSO is judged through Step 435 while bypassing Steps 420 and 430.

After the satisfaction of dθ≧dθ4 and before the lapse of the period To, it is judged in Step 440 if the following four conditions are satisfied:

$$\text{sign } \theta \cdot \theta \geq \theta 4; \quad (11a)$$

$$V \geq V4; \quad (11b)$$

$$\text{sign}\theta \cdot \theta \geq \theta c + \Delta\theta \quad (11c)$$

$$\text{sign}\theta \cdot Gy \geq Gy4, \quad (11d)$$

where V4 and Gy4 are reference values for the vehicle speed V and lateral acceleration Gy. If these conditions are satisfied, EASO is judged.

The condition (11c) allows the monitoring of the increase in the steering angle in the turning direction once after the steering angular speed exceeds the reference value dθ4 (it is possible that the angular speed temporally becomes directed opposite to the turning direction.). Thus, in this process, the variation or tendency of a driving operation changing future behavior of a vehicle can be monitored more precisely.

The reference values dθ4, θ4, Δθ may be determined as a function of yaw rate, lateral acceleration, etc. Further, under a certain condition, conditions (11b) and/or (11d) may be omitted.

Although the present invention has been described in detail with respect to preferred embodiments thereof and some partial modifications thereof, it will be apparent for those skilled in the art that other various modifications are possible with respect to the shown embodiments within the scope of the present invention.

The invention claimed is:

1. A device for controlling a behavior of a vehicle, the device:
    judging a possibility of rolling-over of the vehicle;
    calculating a target braking control amount for reducing the possibility of rolling-over such that the target braking control amount when the possibility of rolling-over is high is higher than when the possibility is low; and
    controlling wheel braking force based upon the target braking control amount,
    wherein increasing and decreasing gradients of the wheel braking force are restricted after the starting of control of the wheel braking force based upon the target braking control amount when the possibility is high as estimated based upon a steering angle effected by a driver.

2. A device according to claim 1,
    wherein a possibility of rolling-over of the vehicle based upon driving operation of a driver and a possibility of rolling-over of the vehicle based upon the behavior of the vehicle are judged; and
    the target braking control amount when the possibility of rolling-over of the vehicle based upon the driving operation is high is rendered larger than that when the possibility of rolling-over of the vehicle based upon the driving operation is not high while the possibility of rolling-over of the vehicle based upon the vehicle behavior is high.

3. A device according to claim 2, the device detecting steering condition for emergency avoidance; and wherein, when the steering condition for emergency avoidance is detected, it is judged that the possibility of rolling-over of the vehicle based upon the driving operation is high.

4. A device according to claim 1, wherein a possibility of rolling-over of the vehicle based upon a driving operation of a driver is judged based upon a steering angle and a steering speed; and a possibility of rolling-over based upon the behavior of the vehicle is judged based upon condition of the vehicle.

5. A device according to claim 4, wherein the condition of the vehicle includes a yaw rate, a lateral deceleration and vehicle speed.

6. A device according to claim 1, wherein the target braking control amount is a target wheel slip ratio, and the wheel braking force is feedback-controlled based upon the target wheel slip ratio and an actual wheel slip ratio.

7. A device according to claim 1, wherein a weight of the vehicle is detected; the target braking control amount is modified based upon the vehicle weight, the target control amount being set larger as the vehicle weight is heavier.

8. A device for controlling a behavior of a vehicle, the device:
    judging a possibility of rolling-over of the vehicle;
    calculating a target braking control amount for reducing the possibility of rolling-over such that the target braking control amount when the possibility of rolling-over is high is higher than when the possibility is low; and controlling wheel braking force based upon the target braking control amount, wherein increasing and decreasing gradients of the wheel braking force is restricted after the starting of control of the wheel braking force based upon the target braking control amount when the possibility is high, and wherein a liability to rolling of the vehicle is detected; and the target braking control amount is modified based upon the liability to rolling, the target braking control amount being set larger as the liability to rolling is larger.

9. A device for controlling a behavior of a vehicle, the device:

judging a possibility of rolling-over of the vehicle;

calculating a target braking control amount for reducing the possibility of rolling-over such that the target braking control amount when the possibility of rolling-over is high is higher than when the possibility is low; and controlling wheel braking force based upon the target braking control amount, wherein increasing and decreasing gradients of the wheel braking force is restricted after the starting of control of the wheel braking force based upon the target braking control amount when the possibility is high, wherein a possibility of rolling-over of the vehicle based upon driving operation of a driver and a possibility of rolling-over of the vehicle based upon the behavior of the vehicle are judged, and the target braking control amount when the possibility of rolling-over of the vehicle based upon the driving operation is high is rendered larger than that when the possibility of rolling-over of the vehicle based upon the driving operation is not high while the possibility of rolling-over of the vehicle based upon the vehicle behavior is high, and wherein the increasing and decreasing gradients are restricted when the possibility of rolling-over of the vehicle based upon the driving operation is high and the increasing and decreasing gradients are not restricted when the possibility of rolling-over of the vehicle based upon the driving operation is not high while the possibility of rolling-over of the vehicle based upon the vehicle behavior is high.

10. A device for controlling a behavior of a vehicle; the device judging a possibility of rolling-over of the vehicle; calculating a target braking control amount for reducing the possibility of rolling-over such that the target braking control amount when the possibility of rolling-over is high is higher than when the possibility is low; controlling wheel braking force based upon the target braking control amount;

wherein a degree of rolling oscillation or pitching oscillation of the vehicle is judged when the possibility is high; and increasing and decreasing gradients of wheel braking force when the degree of rolling oscillation or pitching oscillation is higher is restricted to a larger degree than when the degree of rolling or pitching oscillation is lower.

11. A device according to claim 10, wherein a degree of the restriction of increasing and decreasing gradients of the wheel braking force under control of the device based upon the target braking control amount is varied depending upon a degree of the rolling and/or pitching oscillations.

12. A device according to claim 10, wherein a possibility of rolling-over of the vehicle based upon driving operation of a driver and a possibility of rolling-over of the vehicle based upon the behavior of the vehicle are judged; and the target braking control amount when the possibility of rolling-over of the vehicle based upon the driving operation is high is rendered larger than that when the possibility of rolling-over of the vehicle based upon the driving operation is not high while the possibility of rolling-over of the vehicle based upon the vehicle behavior is high.

13. A device according to claim 12, the device detecting steering condition for emergency avoidance; and wherein, when the steering condition for emergency avoidance is detected, it is judged that the possibility of rolling-over of the vehicle based upon the driving operation is high.

14. A device according to claim 12, wherein the increasing and decreasing gradients are restricted when the possibility of rolling-over of the vehicle based upon the driving operation is high and the increasing and decreasing gradients are not restricted when the possibility of rolling-over of the vehicle based upon the driving operation is not high while the possibility of rolling-over of the vehicle based upon the vehicle behavior is high.

15. A device according to claim 10, wherein a possibility of rolling-over of the vehicle based upon a driving operation of a driver is judged based upon a steering angle and a steering speed; and a possibility of rolling-over based upon the behavior of the vehicle is judged based upon condition of the vehicle.

16. A device according to claim 15, wherein the condition of the vehicle includes a yaw rate, a lateral deceleration and vehicle speed.

17. A device according to claim 10, wherein the target braking control amount is a target wheel slip ratio, and the wheel braking force is feedback-controlled based upon the target wheel slip ratio and an actual wheel slip ratio.

18. A device according to claim 10, wherein a weight of the vehicle is detected; the target braking control amount is modified based upon the vehicle weight, the target control amount being set larger as the vehicle weight is heavier.

19. A device according to claim 10, wherein a liability to rolling of the vehicle is detected; and the target braking control amount is modified based upon the liability to rolling, the target braking control amount being set larger as the liability to rolling is larger.

* * * * *